(12) United States Patent
Yum et al.

(10) Patent No.: US 9,515,711 B2
(45) Date of Patent: Dec. 6, 2016

(54) METHOD FOR RECEIVING DOWNLINK SIGNAL AND APPARATUS THEREFOR

(71) Applicant: LG ELECTRONICS INC., Seoul (KR)

(72) Inventors: Kunil Yum, Seoul (KR); Youngtae Kim, Seoul (KR); Kijun Kim, Seoul (KR); Jonghyun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/892,155

(22) PCT Filed: Jul. 17, 2014

(86) PCT No.: PCT/KR2014/006493
§ 371 (c)(1),
(2) Date: Nov. 18, 2015

(87) PCT Pub. No.: WO2015/016512
PCT Pub. Date: Feb. 5, 2015

(65) Prior Publication Data
US 2016/0094284 A1 Mar. 31, 2016

Related U.S. Application Data

(60) Provisional application No. 61/859,793, filed on Jul. 30, 2013.

(51) Int. Cl.
| | | |
|---|---|---|
| *H04B 7/04* | (2006.01) | |
| *H04B 7/06* | (2006.01) | |
| *H04W 72/04* | (2009.01) | |

(52) U.S. Cl.
CPC .......... *H04B 7/0456* (2013.01); *H04B 7/063* (2013.01); *H04B 7/066* (2013.01); *H04B 7/0617* (2013.01); *H04B 7/0632* (2013.01); *H04B 7/0639* (2013.01); *H04B 7/0647* (2013.01); *H04W 72/042* (2013.01)

(58) Field of Classification Search
CPC ........... H04L 25/0266; H04L 1/2433; H04L 1/0001; H04L 1/0618; H04L 1/06; H04L 7/033; H04B 7/0456; H04B 7/0617; H04B 7/063; H04B 7/0632; H04B 7/0639; H04B 7/0647; H04B 7/066; H04W 72/042
USPC ......................................... 375/220–221, 267
See application file for complete search history.

(56) References Cited

U.S. PATENT DOCUMENTS

| | | |
|---|---|---|
| 2012/0069917 A1 | 3/2012 | Liu et al. |
| 2013/0028186 A1 | 1/2013 | Kim |
| 2013/0162476 A1 | 6/2013 | Thomas et al. |
| 2014/0098689 A1* | 4/2014 | Lee ...................... H04B 7/0469 370/252 |
| 2014/0177683 A1* | 6/2014 | Krishnamurthy .... H04B 7/0469 375/219 |

OTHER PUBLICATIONS

Alcatel-Lucent Shanghai Bell, et al., "Considerations on CSI feedback enhancements for high-priority antenna configurations," 3GPP TSG-RAN WG1 #66, R1-112420, Aug. 2011, 7 pages.
Alcatel-Lucent, et al., "Introduction of Rel 12 feature for Downlink MIMO Enhancement," 3GPP TSG-RAN WG1 Meeting #73, R1-132045, May 2013, 37 pages.
PCT International Application No. PCT/KR2014/006493, Written Opinion of the International Searching Authority dated Oct. 24, 2014, 9 pages.

* cited by examiner

*Primary Examiner* — Sam K Ahn
*Assistant Examiner* — Janice Tieu
(74) *Attorney, Agent, or Firm* — Lee, Hong, Degerman, Kang & Waimey

(57) ABSTRACT

Provided is a method for receiving a downlink signal in a wireless communication system, the method comprising: transmitting, by a user equipment (UE), information on vertical angle restriction to be used for a precoding matrix which the UE desires to an eNodeB (eNB); and receiving, by the UE, a downlink signal precoded according to the information on vertical angle restriction, wherein the information on vertical angle restriction includes values indicating a lower limit angle and an upper limit angle for the precoding matrix.

11 Claims, 15 Drawing Sheets

FIG. 13
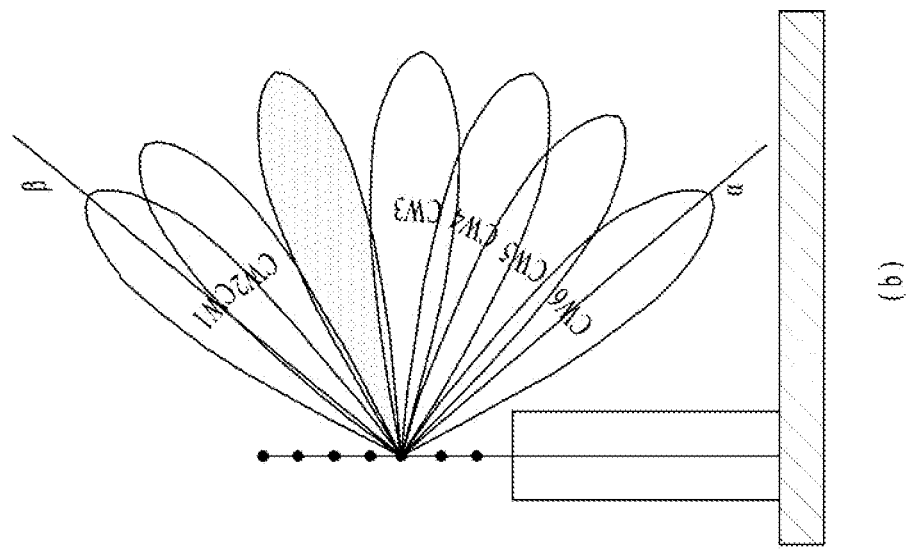
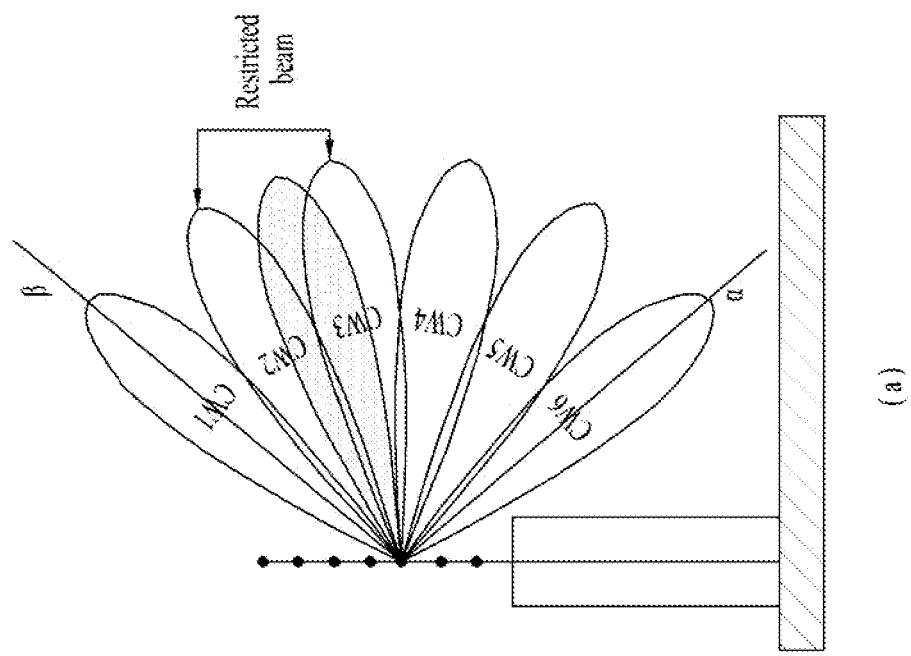

METHOD FOR RECEIVING DOWNLINK SIGNAL AND APPARATUS THEREFOR

CROSS-REFERENCE TO RELATED APPLICATIONS

This application is the National Stage filing under 35 U.S.C. 371 of International Application No. PCT/KR2014/006493, filed on Jul. 17, 2014, which claims the benefit of U.S. Provisional Application No. 61/859,793, filed on Jul. 30, 2013, the contents of which are all hereby incorporated by reference herein in their entirety.

TECHNICAL FIELD

The present invention relates to a wireless communication system and, more particularly, to a method for supporting vertical beam direction angle restriction and an apparatus therefor.

BACKGROUND ART

Recently, various devices requiring machine-to-machine (M2M) communication and high data transfer rate, such as smartphones or tablet personal computers (PCs), have appeared and come into widespread use. This has rapidly increased the quantity of data which needs to be processed in a cellular network. In order to satisfy such rapidly increasing data throughput, recently, carrier aggregation (CA) technology which efficiently uses more frequency bands, cognitive ratio technology, multiple antenna (MIMO) technology for increasing data capacity in a restricted frequency, multiple-base-station cooperative technology, etc. have been highlighted. In addition, communication environments have evolved such that the density of accessible nodes is increased in the vicinity of a user equipment (UE). Here, the node includes one or more antennas and refers to a fixed point capable of transmitting/receiving radio frequency (RF) signals to/from the user equipment (UE). A communication system including high-density nodes may provide a communication service of higher performance to the UE by cooperation between nodes.

A multi-node coordinated communication scheme in which a plurality of nodes communicates with a user equipment (UE) using the same time-frequency resources has much higher data throughput than legacy communication scheme in which each node operates as an independent base station (BS) to communicate with the UE without cooperation.

A multi-node system performs coordinated communication using a plurality of nodes, each of which operates as a base station or an access point, an antenna, an antenna group, a remote radio head (RRH), and a remote radio unit (RRU). Unlike the conventional centralized antenna system in which antennas are concentrated at a base station (BS), nodes are spaced apart from each other by a predetermined distance or more in the multi-node system. The nodes can be managed by one or more base stations or base station controllers which control operations of the nodes or schedule data transmitted/received through the nodes. Each node is connected to a base station or a base station controller which manages the node through a cable or a dedicated line.

The multi-node system can be considered as a kind of Multiple Input Multiple Output (MIMO) system since dispersed nodes can communicate with a single UE or multiple UEs by simultaneously transmitting/receiving different data streams. However, since the multi-node system transmits signals using the dispersed nodes, a transmission area covered by each antenna is reduced compared to antennas included in the conventional centralized antenna system. Accordingly, transmit power required for each antenna to transmit a signal in the multi-node system can be reduced compared to the conventional centralized antenna system using MIMO. In addition, a transmission distance between an antenna and a UE is reduced to decrease in pathloss and enable rapid data transmission in the multi-node system. This can improve transmission capacity and power efficiency of a cellular system and meet communication performance having relatively uniform quality regardless of UE locations in a cell. Further, the multi-node system reduces signal loss generated during transmission since base station(s) or base station controller(s) connected to a plurality of nodes transmit/receive data in cooperation with each other. When nodes spaced apart by over a predetermined distance perform coordinated communication with a UE, correlation and interference between antennas are reduced. Therefore, a high signal to interference-plus-noise ratio (SINR) can be obtained according to the multi-node coordinated communication scheme.

Owing to the above-mentioned advantages of the multi-node system, the multi-node system is used with or replaces the conventional centralized antenna system to become a new foundation of cellular communication in order to reduce base station cost and backhaul network maintenance cost while extending service coverage and improving channel capacity and SINR in next-generation mobile communication systems.

DISCLOSURE

Technical Problem

An object of the present invention devised to solve the problem lies in a method for efficiently transmitting and receiving a downlink signal in a wireless communication system.

The technical problems solved by the present invention are not limited to the above technical problems and those skilled in the art may understand other technical problems from the following description.

Technical Solution

In an aspect of an exemplary embodiment of the present application, provided is a method for receiving a downlink signal in a wireless communication system, the method comprising: transmitting, by a user equipment (UE), information on vertical angle restriction to be used for a precoding matrix which the UE desires to an eNodeB (eNB); and receiving, by the UE, a downlink signal precoded according to the information on vertical angle restriction, wherein the information on vertical angle restriction includes values indicating a lower limit angle and an upper limit angle for the precoding matrix.

Additionally or alternatively, the information on vertical angle restriction may be transmitted through periodic reporting scheme, the information on vertical angle restriction being transmitted at a transmission timing independent of transmission timings of other values for channel state reporting, wherein the information on vertical angle restriction may be dropped when the transmission timing of the information on vertical angle restriction and a transmission timing of an RI (rank indicator) or a CQI (channel quality indicator) overlap, and a PMI (precoding matrix index) may be dropped when the transmission timing of the information on vertical angle restriction and a transmission timing of the PMI overlap.

Additionally or alternatively, the information on vertical angle restriction may be transmitted through periodic reporting scheme, the information on vertical angle restriction being jointly encoded with other values for channel state reporting and transmitted.

Additionally or alternatively, the method further comprise receiving, from the eNB, control information on the vertical angle restriction, wherein the control information may include a hold command for holding an vertical angle of the precoding matrix at a specific angle between the lower limit angle and the upper limit angle and a period for holding the vertical angle.

Additionally or alternatively, the method further comprises receiving, by the UE, control information on the vertical angle restriction from the eNB, wherein the control information may include a hold command for holding an vertical angle of the precoding matrix at a specific angle between the lower limit angle and the upper limit angle, and the hold command may be valid until a holding release command is received.

Additionally or alternatively, the method further comprise receiving, from the eNB, control information on the vertical angle restriction, wherein the control information may include a command for excluding a specific angle range between the lower limit angle and the upper limit angle.

Additionally or alternatively, the control information may include a command for excluding a plurality of specific angle ranges, the method further comprise generating, by the UE, a codebook in an angle range excluding the plurality of specific angle ranges.

In an aspect of another exemplary embodiment of the present application, provided is a method for transmitting a downlink signal in a wireless communication system, the method comprising: receiving, by an eNodeB (eNB), information on vertical angle restriction to be used for a precoding matrix which a user equipment (UE) desires from the UE; and transmitting, by the eNB, a downlink signal precoded according to the information on vertical angle restriction, wherein the information on vertical angle restriction may include values indicating a lower limit angle and an upper limit angle for the precoding matrix.

Additionally or alternatively, the information on vertical angle restriction may be received through periodic reporting scheme, the information on vertical angle restriction being received at a transmission timing independent of transmission timings of other values for channel state reporting, wherein the information on vertical angle restriction may be dropped when the transmission timing of the information on vertical angle restriction and a transmission timing of an RI (rank indicator) or a CQI (channel quality indicator) overlap, and a PMI (precoding matrix index) may be dropped when the transmission timing of the information on vertical angle restriction and a transmission timing of the PMI overlap.

Additionally or alternatively, the information on vertical angle restriction may be received through periodic reporting scheme, the information on vertical angle restriction being jointly encoded with other values for channel state reporting and received.

Additionally or alternatively, the method further comprise transmitting, by the eNB, control information on the vertical angle restriction to the UE, wherein the control information may include a hold command for holding an vertical angle of the precoding matrix at a specific angle between the lower limit angle and the upper limit angle and a period for holding the vertical angle.

Additionally or alternatively, the method further comprises transmitting, by the eNB, control information on the vertical angle restriction to the UE, wherein the control information may include a hold command for holding an angle of the vertical beam direction at a specific angle between the lower limit angle and the upper limit angle, and the hold command may be valid until the UE receives a holding release command.

Additionally or alternatively, the method further comprise transmitting, by the eNB, control information on the vertical angle restriction to the UE, wherein the control information may include a command for excluding a specific angle range between the lower limit angle and the upper limit angle.

Additionally or alternatively, the control information may include a command for excluding a plurality of specific angle ranges, the method may further comprise generating, by the eNB, a codebook in an angle range excluding the plurality of specific angle ranges.

In another aspect of an exemplary embodiment of the present application, provided is a user equipment (UE) configured to receive a downlink signal in a wireless communication system, comprising: a radio frequency (RF) unit; and a processor configured to control the RF unit, wherein the processor may be configured to transmit information on vertical angle restriction to be used for a precoding matrix which the UE desires to an eNodeB (eNB) and to receive a downlink signal precoded according to the information on vertical angle restriction, wherein the information on vertical angle restriction may include values indicating a lower limit angle and an upper limit angle for the precoding matrix.

It is to be understood that both the foregoing general description and the following detailed description are merely exemplary of the invention, and are intended to provide an overview or framework for understanding the nature and character of the invention as claimed.

Advantageous Effects

According to an embodiment of the present invention, it is possible to improve transmission and reception performance in a wireless communication system.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings:

FIG. 13 illustrates an example of vertical beam direction angle restriction according to embodiments of the present invention;

BEST MODE

Figure 1:
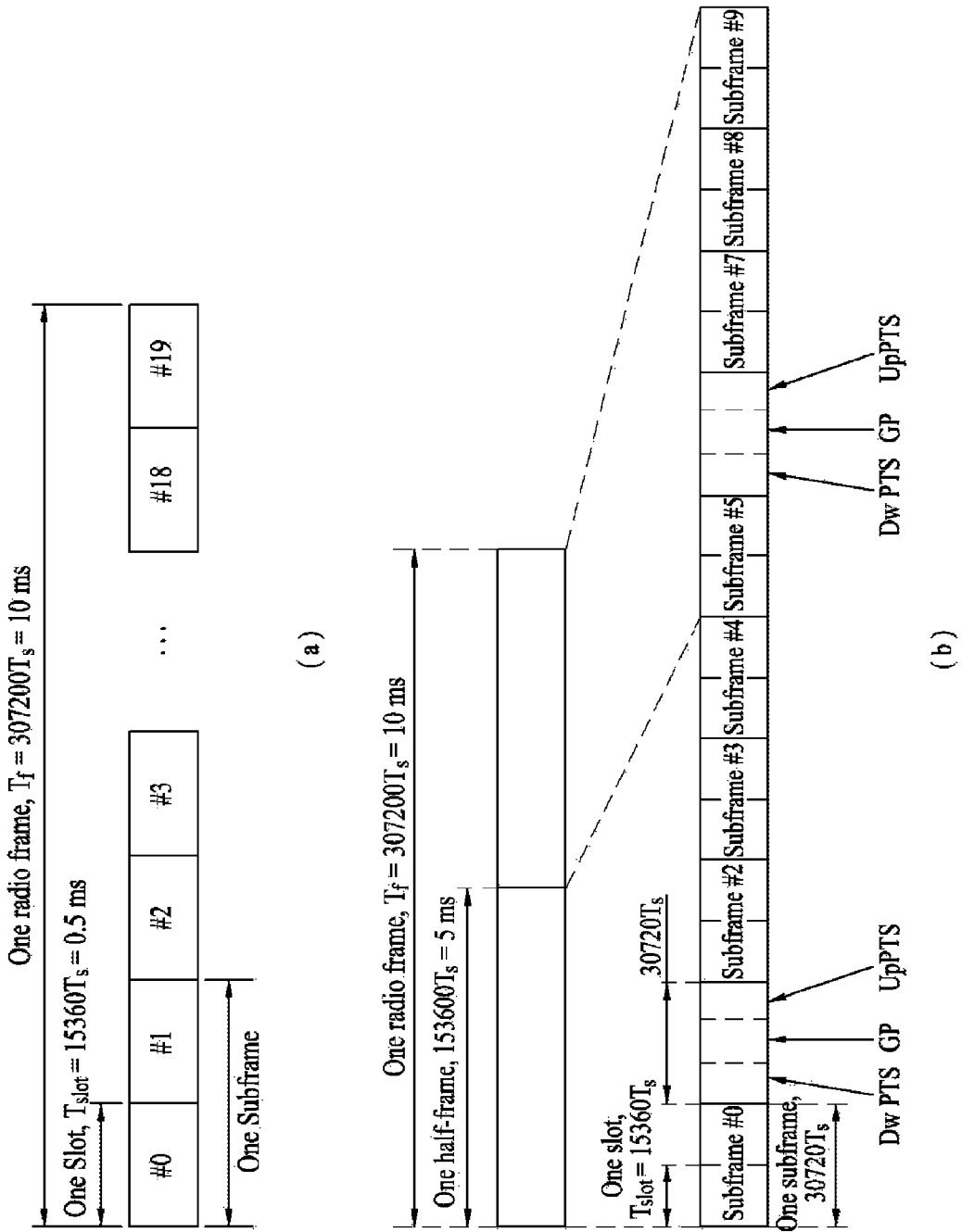
FIG. 1 illustrates an exemplary radio frame structure for use in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g. macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes can be applied to various types of multi-node systems. For example, a node refers to an antenna group spaced apart from another node by a predetermined distance or more, in general. However, embodiments of the present invention, which will be described below, can even be applied to a case in which a node refers to an arbitrary antenna group irrespective of node interval. In the case of an eNB including an X-pole (cross polarized) antenna, for example, the embodiments of the preset invention are applicable on the assumption that the eNB controls a node composed of an H-pole antenna and a V-pole antenna.

A communication scheme through which signals are transmitted/received via plural transmit (Tx)/receive (Rx)

nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming) DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowlegement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as $T_s=1/(2048*15 \text{ kHz})$. Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| | Normal cyclic prefix in downlink | | | Extended cyclic prefix in downlink | | |
| --- | --- | --- | --- | --- | --- | --- |
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | | |
| 5 | $6592 \cdot T_s$ | $4384 \cdot T_s$ | $5120 \cdot T_s$ | $20480 \cdot T_s$ | $4384 \cdot T_s$ | $5120 \cdot T_s$ |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

Figure 2:
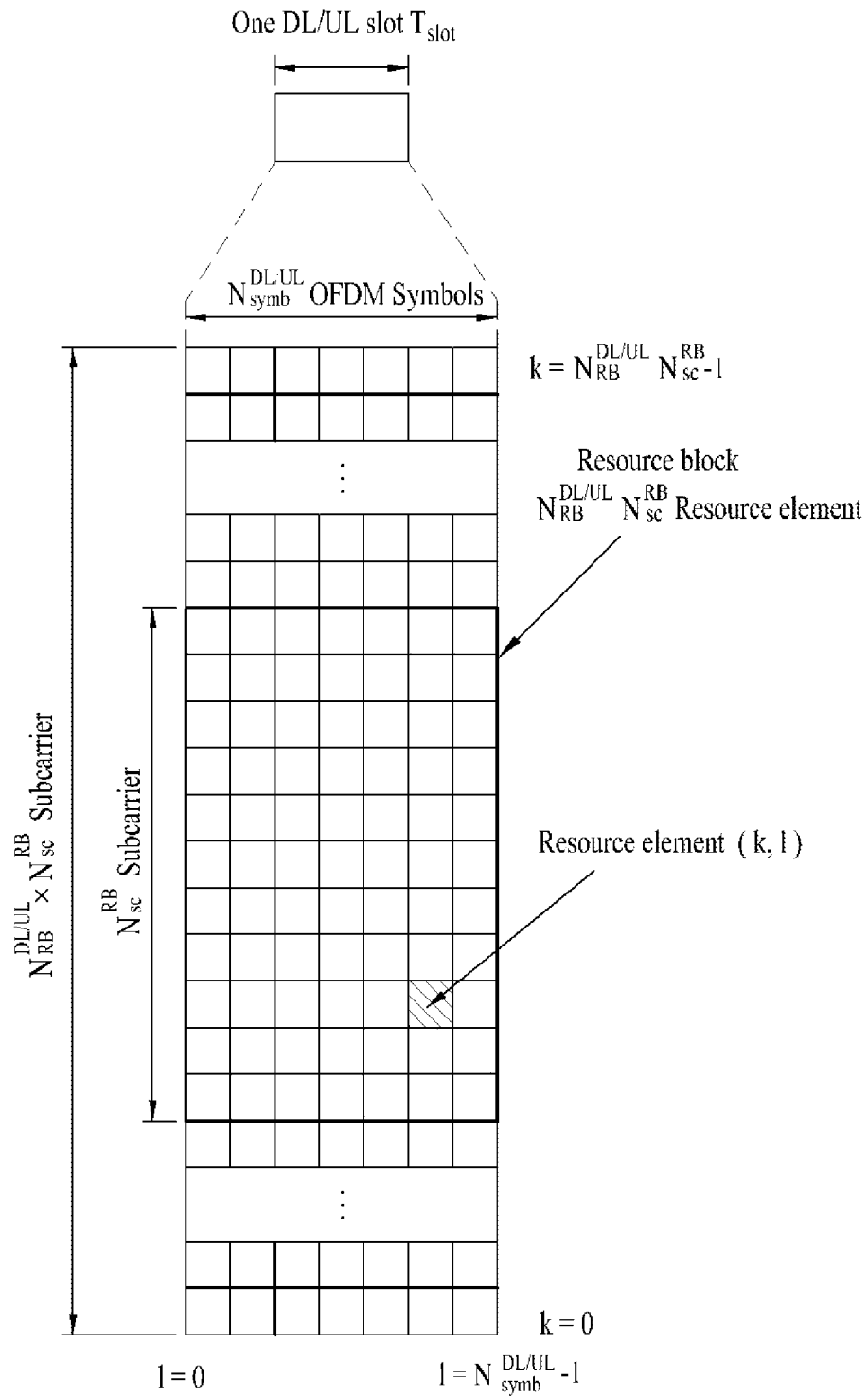
FIG. 2 illustrates a downlink/uplink (DL/UL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g. 7) consecutive OFDM symbols in the time domain and $N_{sc}^{RB}$ (e.g. 12) consecutive subcarriers in the frequency domain. For reference, a resource composed by an OFDM symbol and a subcarrier is called a resource element (RE) or a tone.

Accordingly, an RB is composed of $N_{symb}^{DL/UL} * N_{sc}^{RB}$ REs. Each RE in a resource grid can be uniquely defined by an index pair (k, 1) in a slot. Here, k is an index in the range of 0 to $N_{symb}^{DL/UL} * N_{sc}^{RB} - 1$ in the frequency domain and 1 is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, $n_{PRB} = n_{VRB}$ is obtained. Numbers are given to the localized VRBs from 0 to $N_{VRB}^{DL} - 1$, and $N_{VRB}^{DL} = N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
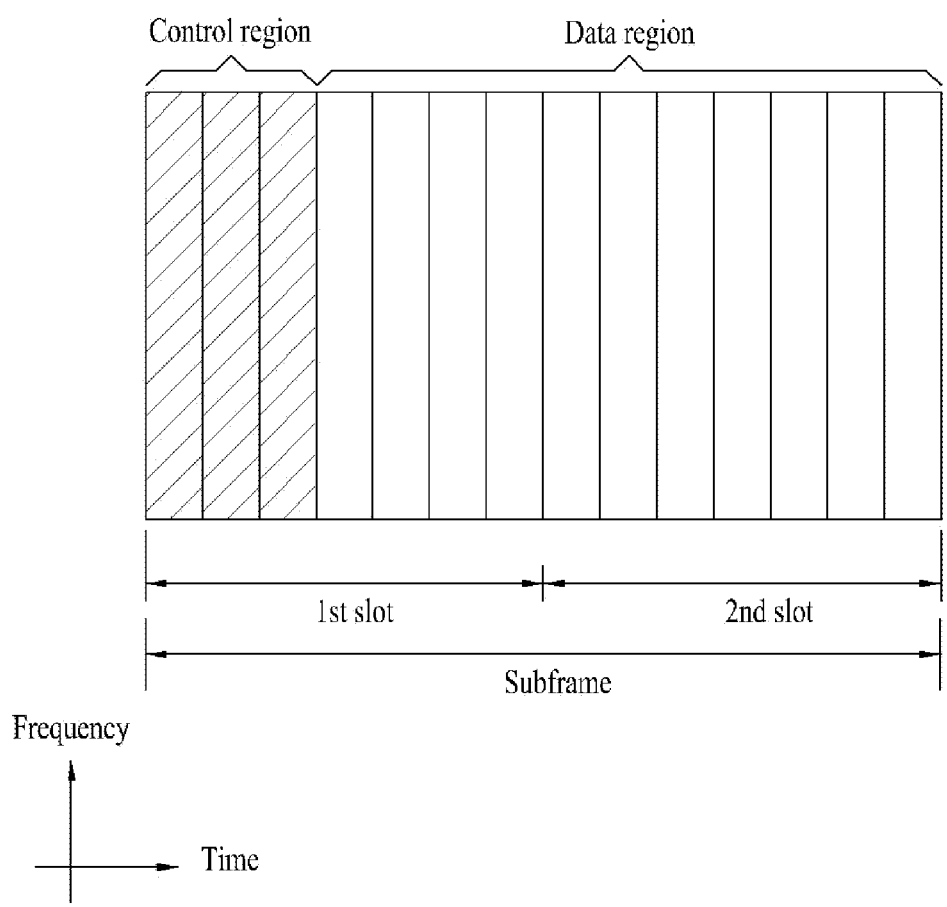
FIG. 3 illustrates an exemplary downlink (DL) subframe structure for use in 3GPP LTE/LTE-A.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| | Search Space | | |
|---|---|---|---|
| Type | Aggregation Level L | Size [in CCEs] | Number of PDCCH candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g. frequency position) of "B" and transmission format information (e.g. transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
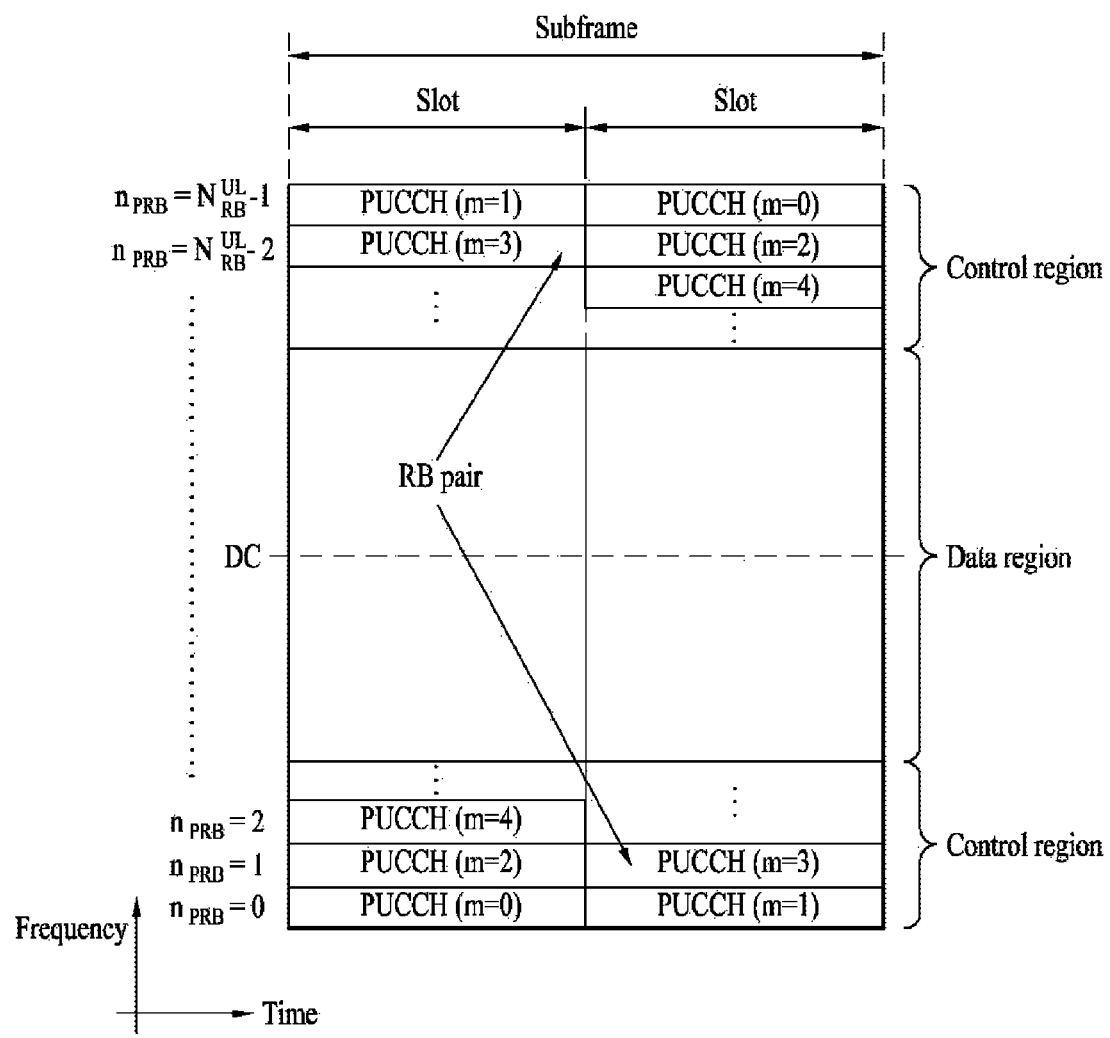
FIG. 4 illustrates an exemplary uplink (UL) subframe structure for use in 3GPP LTE/LTE-A.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon. Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Downlink Channel State Information (CSI) Reporting

Open-loop MIMO operating without channel information and closed-loop MIMO are present in LTE. Particularly, in closed-loop MIMO, each of a transmitting end and a receiving end performs beam forming based on channel information, that is, CSI to obtain MIMO antenna multiplexing gain. To obtain CSI, an end instructs the UE to feed back DL CSI by allocating a physical uplink control channel (PUCCH) or a physical uplink shared channel (PUSCH) to the UE.

CSI is categorized into a rank indicator (RI), a precoding matrix index (PMI) and a channel quality indicator (CQI). The RI indicates rank information of a channel and represents the number of streams that are received by a UE through the same time-frequency resources. The RI is determined by long term fading of the channel, and thus the RI is fed back to an eNB at a longer period than the PMI and CQI. The PMI is a value in which spatial characteristics of a channel are reflected and indicates a precoding matrix index of an eNB preferred by a UE based on a metric such as SINR. The CQI indicates channel intensity and represents a reception SINR that can be obtained by the eNB using the PMI.

In an evolved communication system such as LTE-A, additional multi-user diversity is obtained using MU-MIMO (multi-user MIMO). Since interference is present between UEs multiplexed in the antenna domain in MU-MIMO, accuracy of CSI may largely affect not only a UE that reports the CSI but also interference of other multiplexed UEs. Accordingly, in LTE-A, a final PMI is divided into W1 corresponding to a long-term and/or wideband PMI and W2 corresponding to a short-term and/or subband PMI.

A long-term covariance matrix of a channel, represented by Equation 1, is used as a hierarchical codebook transformation constituting a final PMI based on W1 and W2.

$$W = \text{norm}(W1\,W2) \quad \text{[Equation 1]}$$

In Equation 1, W2 (short-term PMI) is a codeword of a codebook configured to reflect short-term channel state information, W is a codeword of a final codebook, and norm(A) denotes a matrix in which the norm of each column of matrix A is normalized to 1.

W1 and W2 have structures as represented by Equation 2.

$$W1(i) = \begin{bmatrix} X_i & 0 \\ 0 & X_i \end{bmatrix}, \text{ where } X_i \text{ is } Nt/2 \text{ by } M \text{ matrix.} \quad \text{[Equation 2]}$$

$$W2(j) = \begin{bmatrix} \overbrace{e_M^k \quad e_M^l \quad \cdots \quad e_M^m}^{r \text{ columns}} \\ \alpha_j e_M^k \quad \beta_j e_M^l \quad \cdots \quad \gamma_j e_M^m \end{bmatrix} \begin{array}{l} \text{(if rank} = r\text{),} \\ \text{where } 1 \le k, l, m \le M \\ \text{and } k, l, m \text{ are integer.} \end{array}$$

In the codeword structure represented by Equation 2, cross polarized antennas are used. When antenna spacing is narrow (when a distance between neighboring antennas is less than half a signal wavelength, for example), correlation characteristics of a channel are reflected in the codeword structure. The cross polarized antennas can be categorized into a horizontal antenna group and a vertical antenna group which have uniform linear array (ULA) antenna characteristics and are co-located. Therefore, correlation between antennas in each group has the same linear phase increment and correlation between antenna groups has phase rotation characteristics. Consequently, it is necessary to design the codebook by reflecting characteristics of a channel in the codebook because the codebook is composed of values obtained by quantizing the channel. For convenience of description, if a rank-1 codebook generated using the above-described structure is exemplified, the characteristic of the channel are reflected in the codebook satisfying Equation 2.

$$W1(i) * W2(j) = \begin{bmatrix} X_i(k) \\ \alpha_j X_i(k) \end{bmatrix} \quad \text{[Equation 3]}$$

In Equation 3, the codeword is represented by a vector of $N_T$ (the number of Tx antennas)×1 and is composed of an upper vector $X_i(k)$ and a lower vector $a_j X_i(k)$ which respectively represent correlations between horizontal antenna groups and vertical antenna groups. $X_i(k)$ is preferably represented as a vector having linear phase increment in which correlation between antennas in each antenna group is reflected and can use a DFT matrix.

In LTE, CSI feedback schemes are categorized into periodic reporting through a PUCCH corresponding to an uplink control channel and aperiodic reporting through a PUSCH corresponding to an uplink data channel transmitted at the request of an eNB. Aperiodic reporting is set to each UE according to a request bit included in uplink scheduling information transmitted from the eNB to UEs. Each UE transmits, to the eNB, channel information in consideration of a transmission mode thereof through a PUSCH upon reception of the uplink scheduling information. With respect to periodic reporting, a channel information transmission period and an offset in the period are signaled to each UE per subframe through an upper layer signal and channel information in consideration of a transmission mode of each UE is transmitted to the eNB through a PUCCH according to the predetermined period. When data transmitted on uplink is present in a subframe in which the channel information is transmitted in the predetermined period, the channel information is transmitted along with the data through an uplink data channel (PUSCH) instead of an uplink control channel (PUCCH).

Periodic reporting of channel information will now be described in more detail. Reporting modes are classified into four modes according to CQI and PMI feedback type, as shown in the following table.

TABLE 5

| | | PMI Feedback Type | |
|---|---|---|---|
| | | No PMI | Single PMI |
| PUCCH CQI Feedback Type | Wideband (wideband CQI) | Mode 1-0 | Mode 1-1 |
| | UE Selected (subband CQI) | Mode 2-0 | Mode 2-1 |

The reporting modes are classified into a wideband (WB) CQI and a subband (SB) CQI according to CQI feedback type and classified into no PMI and single PMI according to whether a PMI is transmitted. Each UE receives information composed of a combination of a transmission period and an offset through RRC signaling from a higher layer. For example, a UE transmits channel information, as shown in FIG. 5(a), upon reception of information corresponding to a combination of a period of "5" and an offset of "1".

Figure 5:
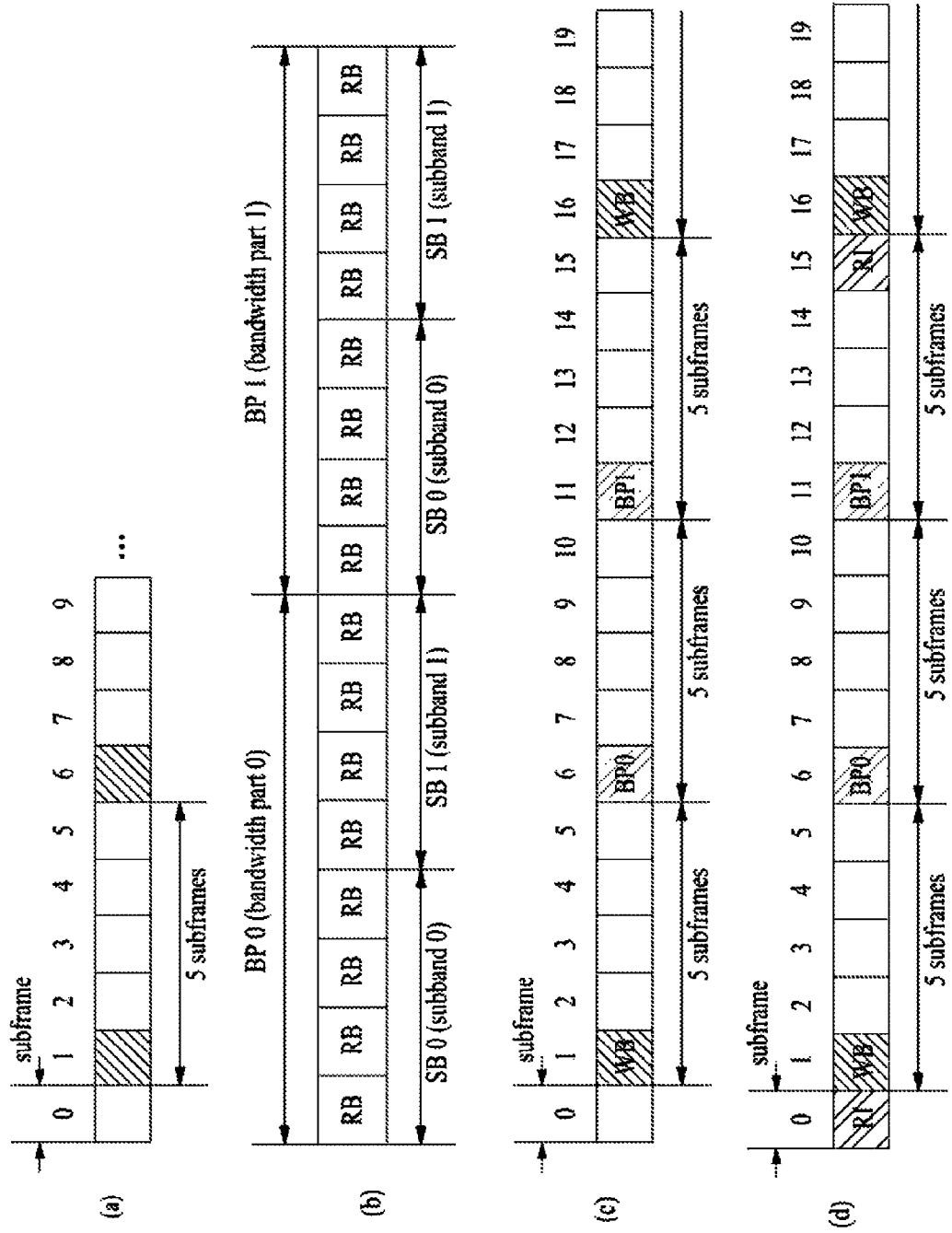
FIG. 5 illustrates a downlink channel state report used in 3GPP LTE/LTE-A.

Upon reception of information corresponding to a combination of a period of "5" and an offset of "1", as shown in FIG. 5(a), the UE transmits channel information every five subframes through a PUCCH with a subframe offset in a direction in which a subframe index increases on the basis of subframe #0. Since subframe indices are composed of combinations of a system frame number ($n_f$) and 20 slot indices ($n_s$ in the range of 0 to 19) corresponding to a a system frame and one subframe includes 2 slots, a subframe index can be represented as $10*n_f+\text{floor}(n_s/2)$.

A type of transmitting WB CQI only and a type of transmitting both the WB CQI and SB CQI are present according to CQI feedback type. According to the type of transmitting the WB CQI only, WB CQI information about the entire band is transmitted in a subframe corresponding to a CQI transmission period. The WB periodic CQI transmission period may be set to {2, 5, 10, 16, 20, 32, 40, 64, 80, 160} ms or no transmission. When a PMI needs to be transmitted according to PMI feedback type in Table 1, the PMI is transmitted along with CQI information. In case of the type of transmitting both the WB CQI and SB CQI, the WB CQI and SB CQI are alternately transmitted. This is described in more detail with reference to FIG. 5(b).

FIG. 5(b) illustrates an exemplary system composed of 16 resource blocks (RBs). In the case of a system having a system frequency bandwidth corresponding to 16 RBs, the system frequency bandwidth is composed of 2 bandwidth parts (BPs) BP0 and BP1. Each BP includes 2 subbands (SBs) SB0 and SB1 each of which is composed of 4 RBs. The number of BPs and the size of each SB are determined on the basis of the number of RBs corresponding to a system frequency bandwidth, and the number of SBs corresponding to each BP is determined on the basis of the number of RBs, the number of BPs and the size of an SB.

In case of transmitting both the WB CQI and SB CQI, the WB CQI is transmitted in a CQI transmission subframe, a CQI with respect to an SB having better channel state between SB0 and SB1 in BP0 and the index of the corresponding SB are transmitted in the next transmission subframe, and then a CQI with respect to an SB having better channel state between SB0 and SB1 in BP1 and the index of the corresponding SB are transmitted in the following transmission subframe. After transmission of the WB CQI, pieces of CQI information about BPs are sequentially transmitted. Here, CQI information about BPs can be transmitted once to four times between a WB CQI and the next WB CQI. For example, when CQI information about BPs is transmitted once, the CQI information is transmitted in the order of WB CQI→BP0 CQI→BP1 CQI→WB CQI. That is, pieces of CQI information about the BPs are sequentially transmitted between two WB CQIs once. When CQI information about BPs is transmitted four times, the CQI information is transmitted in the order of WB CQI→BP0 CQI→BP1 CQI→BP0 CQI→BP1 CQI→BP0 CQI→BP1 CQI→BP0 CQI→BP1 CQI→WB CQI. That is, pieces of CQI information about the BPs are sequentially transmitted between two WB CQIs four times. Information on the number of sequential transmissions is signaled by a higher layer and transmitted through a PUCCH only in a subframe corresponding to information on a combination of a period and an offset signaled by a higher layer, described above with reference to FIG. 5(a), irrespective of WB CQI or SB CQI. When a PMI needs to be transmitted according to PMI feedback type, the PMI is transmitted along with CQI information. When a PUSCH for uplink data transmission is present in the corresponding subframe, the PMI is transmitted along with data through the PUSCH instead of the PUCCH.

FIG. 5(c) illustrates CQI transmission when both the WB CQI and SB CQI are transmitted and information corresponding to a combination of a period of "5" and an offset of "1" is signaled, as shown in FIG. 5(a).

In case of RI transmission, an RI is signaled by a combination of a transmission period corresponding to a multiple of the WB CQI transmission period and an offset in the transmission period. Here, the offset is a relative offset with respect to the CQI transmission offset. For example, when the offset with respect to the CQI is "1" and the offset with respect to the RI is "0", the RI is considered to have the same offset as the CQI. The offset of the RI is defined as 0 or a negative number.

FIG. 5(d) illustrates a case in which the RI transmission period corresponds to the WB CQI transmission period and the RI offset is "−1" in the same environment as FIG. 5(c). Since the RI transmission period corresponds to the WB CQI transmission period and the RI offset is "−1" with respect to the CQI offset of "1" in FIG. 5(c), the RI is transmitted based on subframe #0. If the RI offset is "0" instead of "−1", then WB CQI transmission and RI transmission subframe overlap. In this case, the WB CQI is dropped and the RI is transmitted.

The CQI, PMI and RI are transmitted by each UE according to RRC signaling of a higher layer, as described above. The eNB needs to transmit information suitable for each UE to each UE in consideration of channel state of each UE, a UE distribution situation in the eNB, etc.

CRI

With regard to antennas, antenna elements have been installed in the horizontal direction and a horizontal antenna beam has been considered. Accordingly, to transmit data of a high signal to a receiver, horizontal beamforming is performed. With the introduction of technology of installing antenna elements in the vertical direction at a transmitter and considering a vertical antenna beam, a transmission gain higher than that obtained by the conventional technology can be expected.

Figure 6:
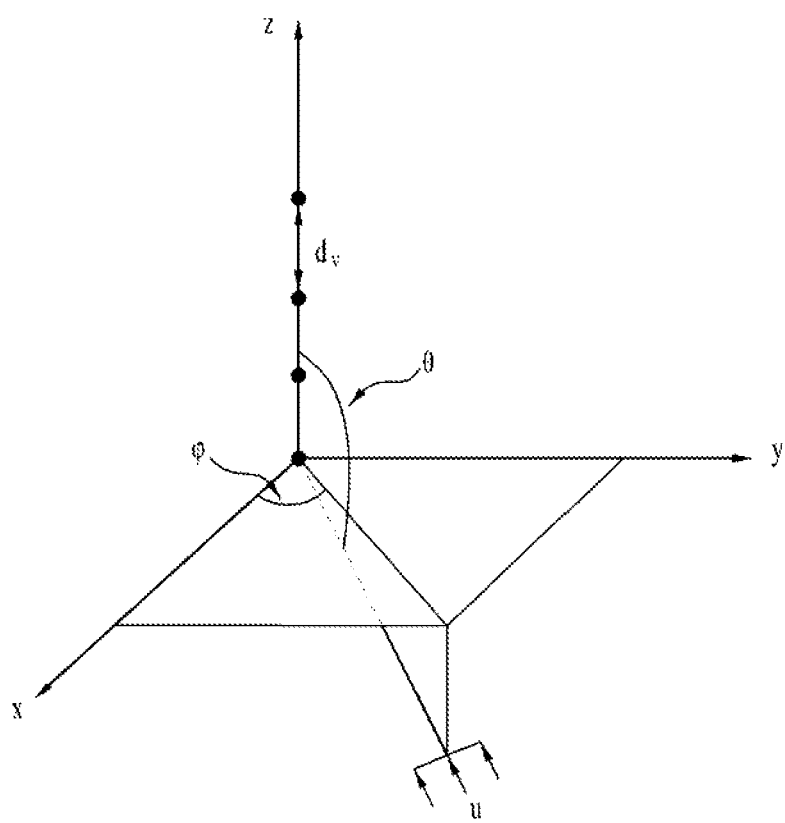
FIG. 6 illustrates beams at vertical angles according to a vertical antenna array.

An antenna including antenna elements disposed in the vertical direction (or antenna elements disposed in the horizontal direction), which are installed in part of a transmitter or in the entire transmitter, is assumed, as shown in FIG. 6. In FIG. 6, 4 antenna elements are disposed at an interval of $d_v$ in the vertical direction. Here, an azimuth angle $\phi$ and an elevation angle $\theta$ determine an antenna beam direction toward a position u. Elements of a channel V according to a phase difference caused by a path difference between antenna elements in the antenna beam pointing the position u can be represented as follows.

$$v_m(\theta,\phi) = \exp(2\pi \cdot j \cdot (m-1) \cdot d_v \cdot \cos(\theta)/\lambda) \quad \text{[Equation 4]}$$

In Equation 4, $m = 1, 2, \ldots, M$ (M being the number of antenna elements for beamforming in the vertical or horizontal direction) and $\cos \theta$ is an angle based on the positive direction of z-axis, 0° corresponding to the positive direction of z-axis, 180° corresponding to the negative direction of z-axis.

A codebook for a beamforming vector can be selected as one or more rows from a matrix having a DFT (discrete Fourier transform) matrix. The DFT matrix is as follows.

$$D_{(mn)}^{M \times Ma} = \frac{1}{\sqrt{M}} e^{j \frac{2\pi(m-1)(n-1)}{Ma}}, \; m = 1, 2, \ldots, M, \; \text{and} \; n = 1, 2, \ldots, M \cdot a \quad \text{[Equation 5]}$$

In Equation 5, (mn) denotes elements of (m,n) in D matrix and a denotes an oversampling factor. Basically, the rows of D matrix of Equation 5 have a characteristic that elements in one row have a linearly increasing phase. Accordingly, elements corresponding to the n-th row in D matrix have a phase increment of $$\frac{2\pi(n-1)}{Ma}.$$

This increment is quantized by Ma between 0 and $2\pi$ and shared by columns.

Elements of a beamforming vector W are defined as follows.

$$\omega_m = \frac{1}{\sqrt{M}} \exp(-j \cdot (m-1) \cdot \theta_{beam}), \; m = 1, 2, \ldots M \quad \text{[Equation 6]}$$

Equation 6 assumes a case in which the beamforming vector corresponds one of rows of the DFT matrix. Accordingly, when the n-th row of the DFT matrix of Equation 5 corresponds to the beamforming vector, $\theta_{beam}$ becomes $$\frac{2\pi(n-1)}{Ma}$$

which represents a phase increment $\Delta P$ between columns in the DFT codebook matrix, as represented by the following equation.

$$\frac{1}{\sqrt{rM}} \begin{bmatrix} e^{j\phi_{1,n}} & e^{j\phi_{1,n}} & e^{j\phi_{1,n}} & \ldots & e^{j\phi_{1,n}} \\ e^{j\phi_{2,n}} & e^{j\phi_{2,n}}e^{j\frac{2k_1\pi}{M}} & e^{j\phi_{2,n}}e^{j\frac{2k_2\pi}{M}} & \ldots & e^{j\phi_{2,n}}e^{j\frac{2k_{r-1}\pi}{M}} \\ e^{j\phi_{3,n}} & e^{j\phi_{3,n}}e^{j\frac{4k_1\pi}{M}} & e^{j\phi_{3,n}}e^{j\frac{4k_2\pi}{M}} & \ldots & e^{j\phi_{3,n}}e^{j\frac{4k_{r-1}\pi}{M}} \\ \vdots & \vdots & \vdots & \ddots & \vdots \\ e^{j\phi_{M,n}} & e^{j\phi_{M,n}}e^{j\frac{2(M-1)k_1\pi}{M}} & e^{j\phi_{M,n}}e^{j\frac{2(M-1)k_2\pi}{M}} & \ldots & e^{j\phi_{M,n}}e^{j\frac{2(M-1)k_{r-1}\pi}{M}} \end{bmatrix},$$ [Equation 7]

$$\Delta P = e^{j\phi_{2,n}} - e^{j\phi_{1,n}}$$

Referring to Equation 4, a phase difference caused by a path difference between antenna elements in the same row of an antenna array is $$\Delta\text{phase} = \frac{2\pi d_v}{\lambda}\cos\theta.$$

Figure 7:
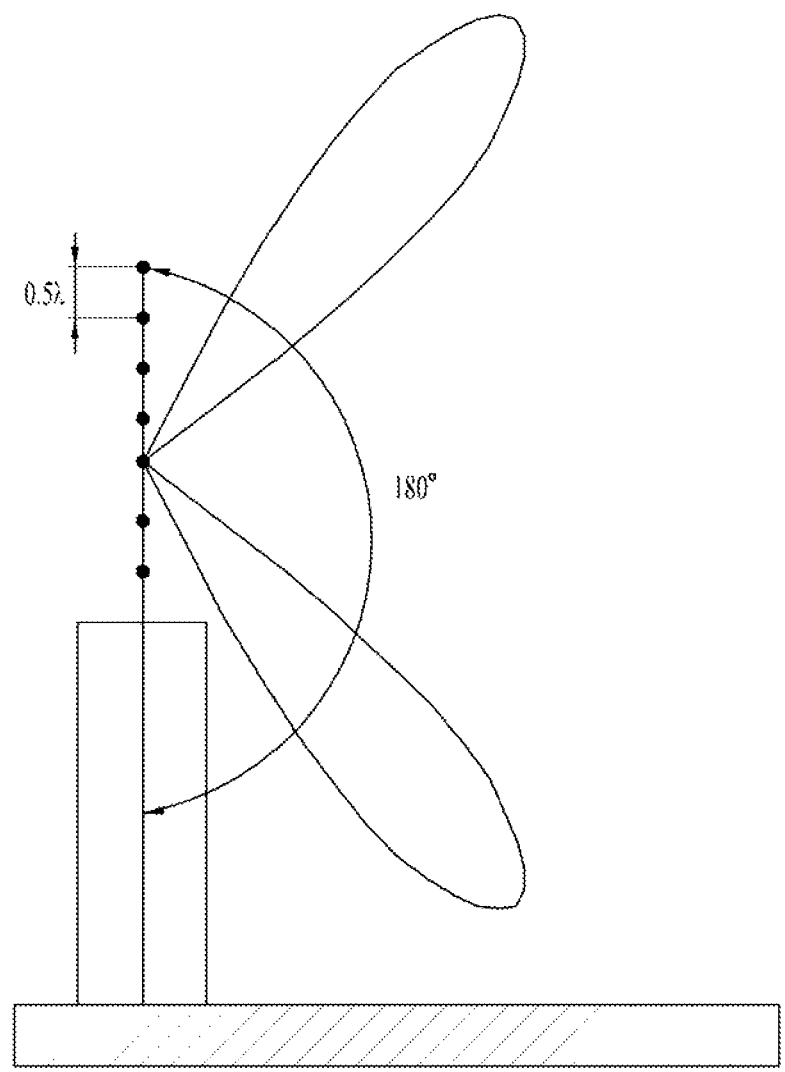
FIG. 7 illustrates beams at vertical angles according to a vertical antenna array.

The range of this value determines the range of $\theta_{beam}$ where $\theta$ represents a beam direction in the coordinate system as shown in FIG. 6. If $d_v$ is 0.5λ and $\theta$ is in the range of 0°≤θ≤180°, that is, θ is not restricted, then the range of Δphase corresponds to −π≤Δphase≤π. In this case, the value of $\theta_{beam}$ need not be restricted, as shown in FIG. 7.

Figure 8:
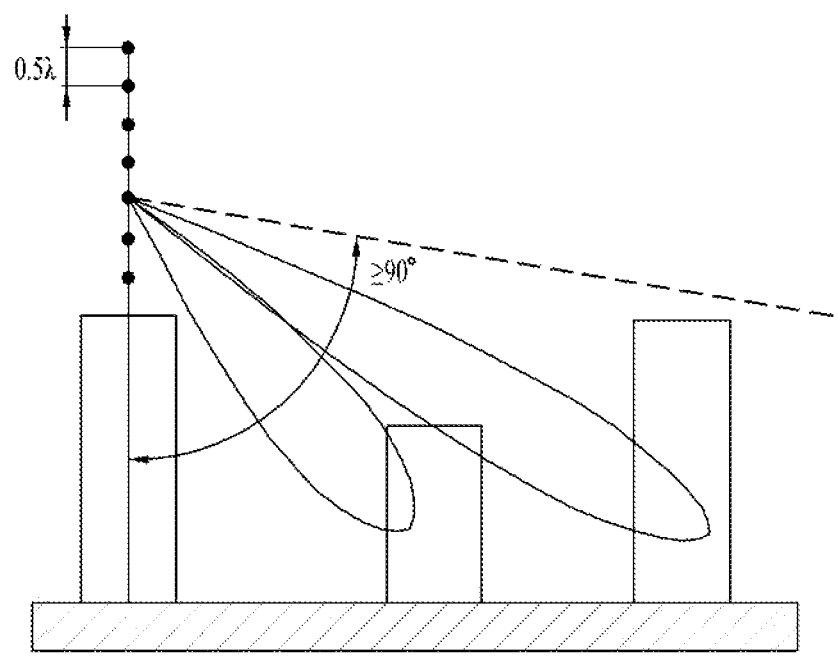
FIG. 8 illustrates beams at restricted vertical angles according to embodiments of the present invention.

However, if an eNB is located higher than surrounding buildings in a macro cell, then the effective range of θ becomes 90°≤θ≤180°, as shown in FIG. 8, and thus the effective range of Δphase becomes −π≤Δphase≤0. Accordingly, close codewords can be generated using the same quantization bit by quantizing the phase increment by Ma between −π and 0 rather than between 0 to 2π when a DFT codebook is formed, to thereby improve system performance.

Here, the following precoding vector can be considered.

$$\omega_m = \frac{1}{\sqrt{M}}\exp(-2\pi \cdot j \cdot (m-1) \cdot d_v \cdot \cos(\theta_{beam2})/\lambda),$$ [Equation 8]

$$m = 1, 2, \ldots M$$

This is similar to Equation 4 and the beam direction corresponds to $\theta_{beam2}$ when the above codeword is used. In this case, the beam direction may be directly limited by restricting $\theta_{beam2}$. Here, restriction is represented as follows.

$$\alpha \leq \theta_{beam2} \leq \beta$$ [Equation 9]

In Equation 9, α and β are angle values that directly restrict the beam direction in the antenna array, like 90°≤θ≤180° in FIG. 8.

The codebook designed as represented by Equation 8 can improve system performance since unnecessary codewords are not used and can control inter-cell or inter-user interference more efficiently.

Restriction of the phase increment ΔP in the DFT codebook in Equation 7, instead of α and β, may be considered. Here, restriction is represented as follows.

$$\gamma \leq \Delta P \leq \delta$$ [Equation 10]

When restriction is set on a DFT matrix of a codebook for one layer (rank 1) as in Equation 7, the DFT codebook is designed using Equation 5 as in the conventional scheme if δ−γ is greater than 2π. However, when δ−γ is less than 2π, the DFT codebook can be designed as follows.

$$D_{(mn)}^{M \times Ma} = \frac{1}{\sqrt{M}}\exp\left(j\left\{\gamma(m-1) + \frac{\delta - y)(m-1)(n-1)}{Ma}\right\}\right),$$ [Equation 11]

$$m = 1, 2, \ldots, M, \text{ and } n = 1, 2, \ldots, M \cdot a$$

While the 1-rank DFT codebook is exemplified, the aforementioned cases may be extended and applied to higher ranks or codebooks other than the DFT codebook.

The present invention provides a method by which a UE signals a desired vertical beam restriction value to an eNB using a PUCCH by defining a CRI (channel restriction index) and feeding back the CRI.

The CRI is a K-bit index containing information γ and δ (or α and β). K can be varied according to an available payload size and a representation method of γ and δ (or α and β). For example, when α and β are fed back, the angle between 0° to 180° can be divided into ranges corresponding to K bits to feed back a specific index. Otherwise, an index of a specific set from among sets of γ and δ (or α and β), which are predetermined between the UE and the eNB or known to the UE and the eNB through RRC signaling, can be fed back.

In this case, the same number of bits may not be allocated to γ and δ (or α and β) when γ and δ, and α and β are transmitted. For example, if α is allocated a larger number of bits and transmitted, then the range of β can be reduced based on the transmitted α since α and β satisfy Equation 9.

$$\alpha \leq \beta \leq 180°$$ [Equation 12]

That is, β can be fed back with a smaller number of bits in such a manner that an angle satisfying Equation 12, that is, an angle in a range narrower than the range of 0° to 180° is divided into sections and an index of a desired section is fed back.

CRI Reporting Scheme

Figure 9:
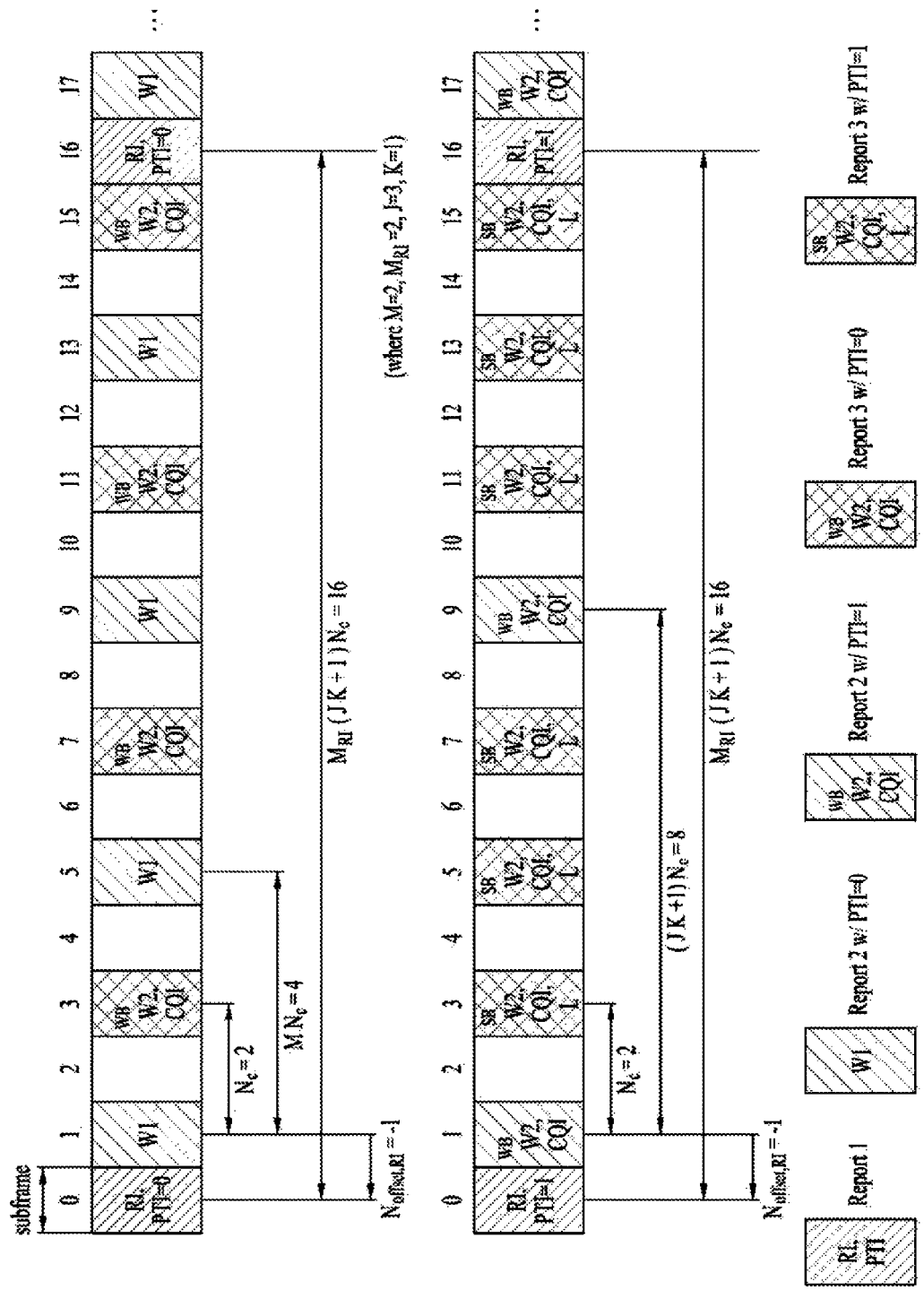
FIG. 9 illustrates downlink channel state reporting used in 3GPP LTE/LTE-A.

A method for transmitting γ and δ (or α and β) using a periodic feedback scheme is provided. In LTE-A, in case of mode 2-1 of Table 5, a PTI (precoder type indication) parameter corresponding to a 1-bit indicator is set and periodic reporting modes of two types, as illustrated in FIG. 9, are considered according to the PTI parameter. In FIG. 9, W1 and W2 indicate the aforementioned hierarchical codebooks. Upon determination of both W1 and W2, W1 and W2 are combined to determine a precoding matrix W.

That is, in the case of periodic reporting mode 2-1, different reports corresponding to report 1, report 2 and report 3 are reported in different repetition periods, as shown in FIG. 9. Specifically, an RI and a 1-bit PTI value are reported through report 1, WB W1 (when PTI=0) or WB W2 and WB CQI (when PTI=1) are reported through report 2, and WB W2 and WB CQI (when PTI=0) or SB W2 and SB CQI (when PTI=1) are reported through report 3.

The present invention proposes the following method for separately feeding back a CRI that restricts the range of a codebook, like W1 and W2, and a hierarchical codebook of channel feedback W based on a codebook generated in the range restricted by the CRI.

CRI Transmission Using the Entire Independent Report Instance

Figure 10:
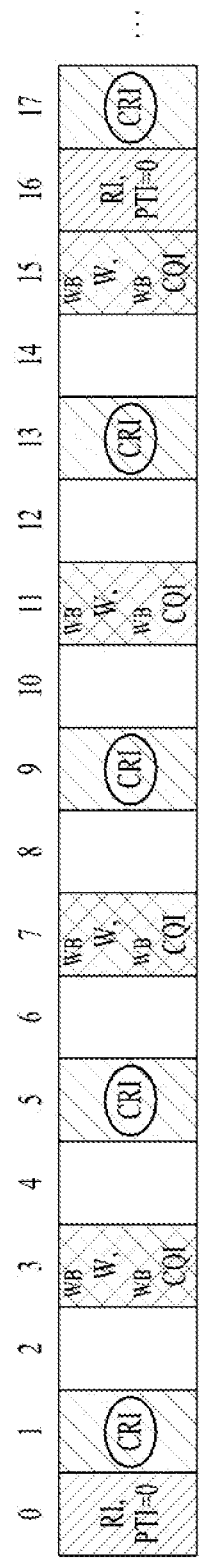
FIG. 10 illustrates a method for transmitting information on vertical beam direction angle restriction according to embodiments of the present invention.

FIG. 10 illustrates a case in which a CRI is fed back through W1 report instance when PTI=0 in feedback mode 2-1. The CRI uses the entire subframe corresponding to a report instance.

A location relation among the CRI, an RI and W is determined based on parameters, a CRI feedback period and an offset, which are set through RRC signaling. While the aforementioned case shows an example in which the CRI changes in the short term, the feedback method can also be used in a case in which the CRI changes in the long term.

The currently used PUCCH payload size is 11 bits. A space corresponding to bits less than 11 bits may be used considering a code rate and the CRI can be fed back using one of indices corresponding to divided angles in a codebook according to whether an available space is present. Alternatively, one of sets predetermined by a UE and an eNB through RRC signaling may be fed back through the CRI. When the CRI is transmitted in this manner, W denotes a codeword index in a codebook generated based on the CRI. It is assumed that a method of generating the codebook is known to the UE and the eNB.

In this case, a problem may be generated when the CRI and a transmission instance of another parameter overlap. Here, the CRI is dropped when the CRI and an RI or a CQI overlap and W is dropped when the CRI and W overlap. When the CRI is dropped, W can be determined using a codebook generated based on the most recently fed back CRI and fed back.

Transmission Through Joint Encoding with Other Parameters

When there are many parameters that need to be fed back as in a case in which a WB/SB CQI is transmitted, the CRI and other parameters are preferably transmitted together in one transmission instance through joint encoding. When the CRI is expected to change in the long term, the CRI can be joint-encoded with the RI which is a currently used long-term feedback parameter.

Figure 11:
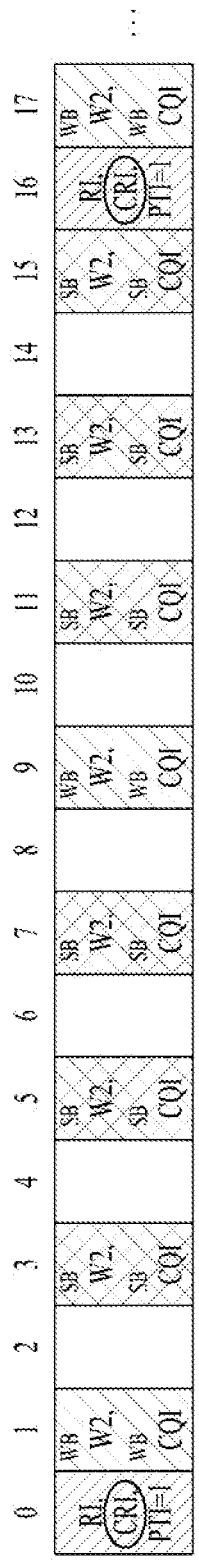
FIG. 11 illustrates a method for transmitting information on vertical beam direction angle restriction according to embodiments of the present invention.

FIG. 11 illustrates an example of transmitting the CRI, RI and PTI through joint encoding. When the RI which is currently used as a long-term parameter in feedback mode 2-1 and the CRI are joint-encoded, 8 bits of an 11-bit payload can be allocated to the CRI except for 1 bit for the PTI since 2 bits are used for the RI. Considering a low code rate required for the RI, less than 8 bits can be used for the CRI.

When the CRI is joint-encoded with 4-bit W and 7-bit CQI, all 11 bits are occupied by W and CQI and thus a method for securing an additional space, such as subsampling of a codebook, is required in order to transmit the CRI in the 11-bit payload.

In the meantime, joint encoding may not be easily performed according to situation. In this case, a new feedback configuration can be used as follows.

Transmission Through New Feedback Configuration

While the case in which antenna elements form one row has been described, this method can be applied when a codebook is restricted and fed back in a 2-dimensional or more antenna array.

CRI Restriction by an eNB

Holding CRI at a Specific Value

The eNB may need to hold $\gamma$ and $\delta$ (or $\alpha$ and $\beta$) at values at specific time as necessary in order to prevent interference from being applied to other UEs or other cells. To achieve this, the eNB can hold the CRI. As illustrated in FIG. 12(a), the eNB can transmit a CRI hold command along with information on a hold time to a UE such that the UE cannot change $\gamma$ and $\delta$ (or $\alpha$ and $\beta$) for a predetermined time.

Furthermore, as shown in FIG. 12(b), the eNB can transmit the CRI hold command to the UE to hold the CRI. The CRI can be held until the eNB transmits a release command to the UE. When $\gamma$ and $\delta$ (or $\alpha$ and $\beta$) need to be held at specific values, $\gamma$ and $\delta$ (or $\alpha$ and $\beta$) that need to be held can be simultaneously transmitted in the aforementioned two cases.

Exclusion of a Specific CRI

When a codebook is generated by feeding back $\gamma$ and $\delta$ (or $\alpha$ and $\beta$) as described above, the range of the codebook can be designated. A specific beam direction may need to be restricted within the predetermined range due to interference applied to other cells or other UEs. In this case, codebook subset restriction is used. If the codebook is changed according to $\gamma$ and $\delta$ (or $\alpha$ and $\beta$), then a beam cannot be correctly restricted. Accordingly, the following method is proposed.

A beam restricted for codebook subset restriction is based on a basic codebook, that is, a codebook generated without being restricted by $\gamma$ and $\delta$ (or $\alpha$ and $\beta$). In addition, a UE, which has received a restricted codeword, can perform codebook subset restriction by restricting all codewords overlapping with the restricted codeword, from among codewords in a codebook restricted by $\gamma$ and $\delta$ (or $\alpha$ and $\beta$).

For example, when codewords with indices of 1 to 6 are present and information on restriction of a specific beam such as a shaded beam is received, as shown in FIG. 13(a), the aforementioned method restricts codewords 2 and 3.

Alternatively, the following method can be used.

When a codebook is generated using $\gamma$ and $\delta$ (or $\alpha$ and $\beta$), the codebook can be generated in a region other than a restricted codeword region. For example, if restriction of $\epsilon \leq \theta_{restriction} \leq \upsilon$ is set due to codebook subset restriction when a restricted codebook is generated according to the method of Equation 9 or 10, the codebook can be generated within the range of $\alpha \leq \theta_{beam2} \leq \epsilon$ and $\upsilon \leq \theta_{beam2} \beta$. This method is applied to a plurality of restrictions in the same manner. That is, a new codebook can be generated in a region other than a restricted range, as shown in FIG. 13(b).

Figure 14:
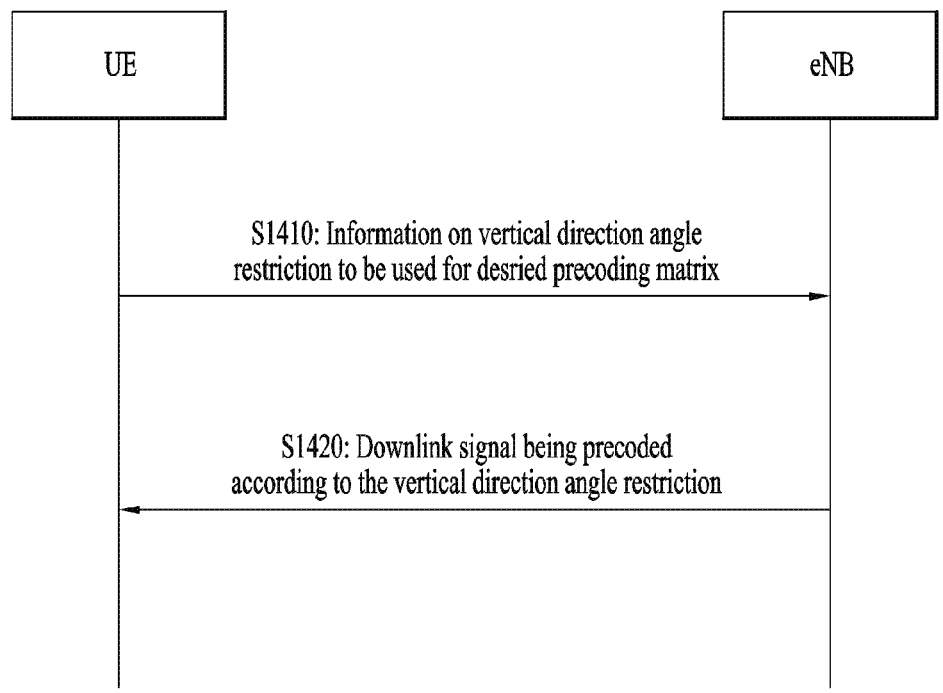
FIG. 14 is a flowchart illustrating an operation according to an embodiment of the present invention.

FIG. 14 illustrates an operation according to an embodiment of the present invention.

A UE 1 may transmit, to an eNB 2, information about angle restriction of a vertical beam direction to be used for a precoding matrix that the UE 1 desires (S1410). The information about angle restriction of the vertical beam direction may be values indicating the lower limit angle and the upper limit angle of the vertical beam direction. For example, the information about angle restriction of the vertical beam direction may be indices respectively indicating the lower limit angle and the upper limit angle and represented as bit values.

The UE 1 may receive, from the eNB 2, a downlink signal precoded according to the information about angle restriction of the vertical beam direction (S1420). The eNB 2 may restrict a precoding codebook according to the information about angle restriction of the vertical beam direction and use a vertical angle within the range of angle restriction for precoding, for example.

The information about angle restriction of the vertical beam direction may be transmitted through a periodic reporting scheme. In addition, the information about angle restriction of the vertical beam direction may be transmitted at a transmission timing different from transmission timing of other values for channel state reporting, for example, RI (rank indicator), CQI (channel quality indicator) or PMI (precoding matrix index) defined in the conventional periodic reporting scheme. In this case, when transmission timing of the information about angle restriction of the vertical beam direction and transmission timing of the RI or CQI overlap, the information about angle restriction of the vertical beam direction is dropped, that is, is not transmitted. When the transmission timing of the information about angle restriction of the vertical beam direction and transmission timing of the PMI overlap, the PMI may be dropped.

In addition, the information about angle restriction of the vertical beam direction may be jointly encoded with other values for channel state reporting and transmitted.

The UE 1 may receive control information about angle restriction of the vertical beam direction from the eNB 2. The control information may include a hold command for holding the angle of the vertical beam direction at a specific angle between the lower limit angle and the upper limit angle and a hold period.

The UE 1 may receive the control information about angle restriction of the vertical beam direction from the eNB 2 and the control information may include the hold command for holding the angle of the vertical beam direction at a specific angle between the lower limit angle and the upper limit angle. Holding according to the hold command may be maintained until a holding release command is received.

Angle restriction may be used for interference control. For the hold period or until the release command is received, the UE 1 may not perform feedback for angle restriction of the vertical beam direction and expect transmission of a downlink signal precoded using the held vertical beam direction angle.

The UE 1 may receive a command for excluding a specific angle range between the lower limit angle and the upper limit angle from the eNB 2. The method of excluding a specific angle range may also be used for interference control. In addition, the UE 1 may receive a command for excluding a plurality of specific angle ranges from the eNB 2. In this case, the range of an available angle is divided into three or more ranges and a codebook corresponding to each range can be generated.

While an embodiment of the present invention has been briefly described with reference to FIG. 14, the embodiment related to FIG. 14 may include at least part of the aforementioned embodiments alternatively or additionally.

Figure 12:
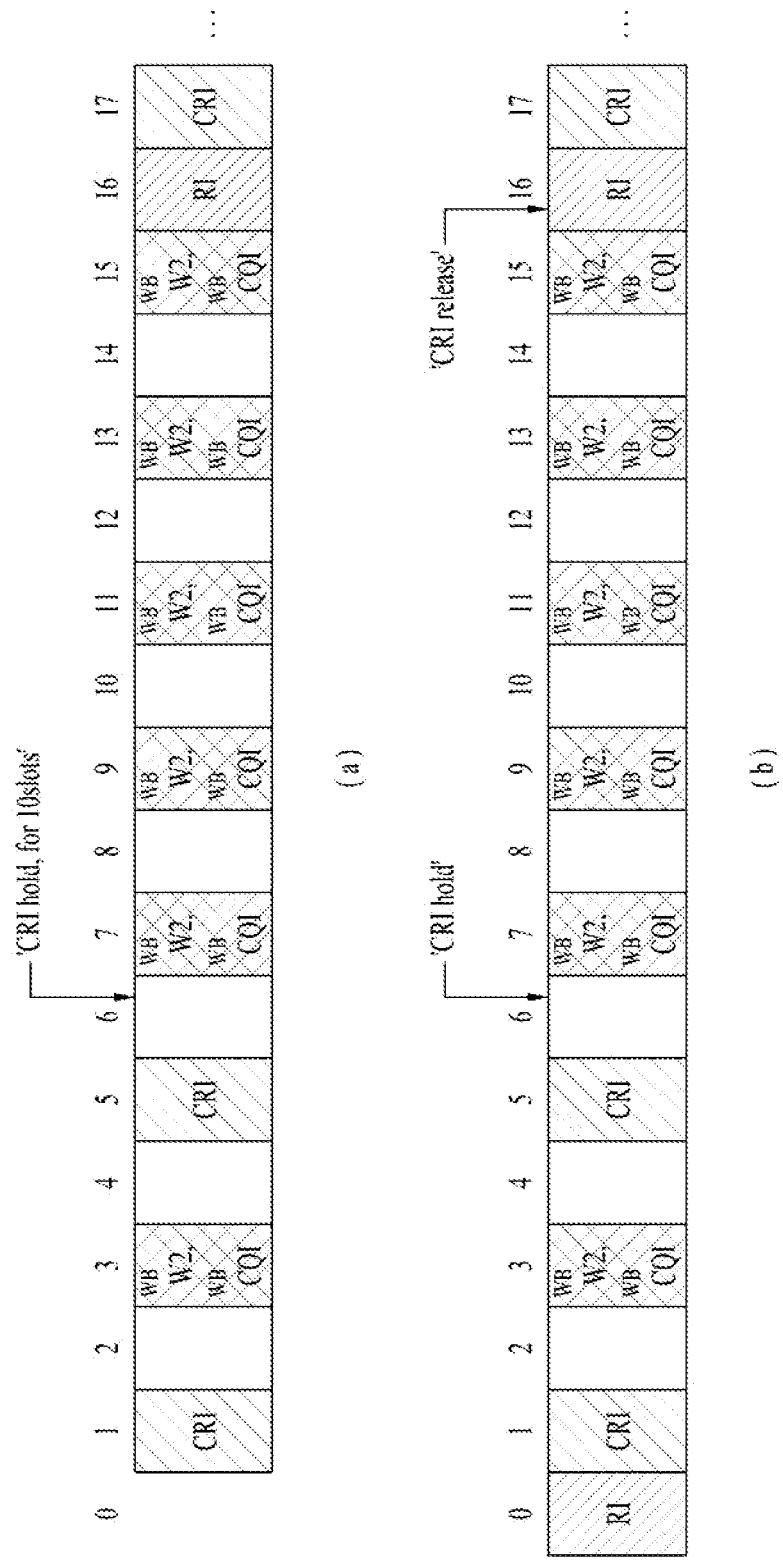
FIG. 12 illustrates an example of vertical beam direction angle restriction according to embodiments of the present invention.
Figure 15:
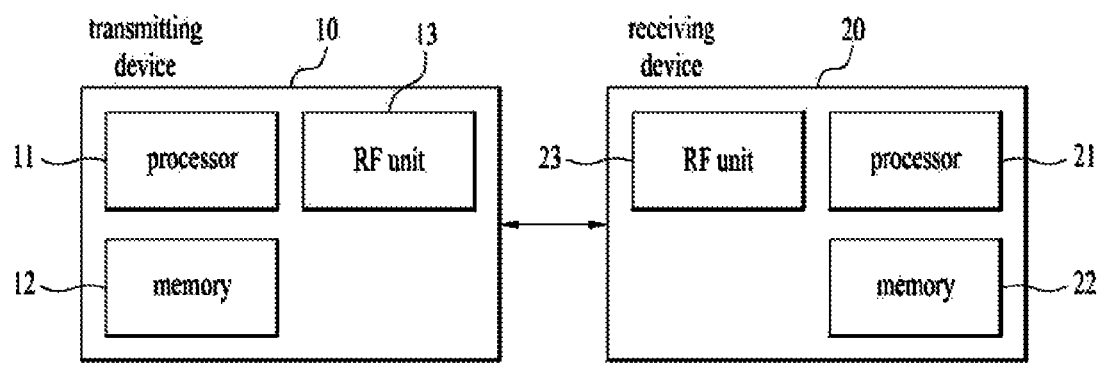
FIG. 15 is a block diagram of an apparatus for implementing embodiments of the present invention.

FIG. 15 is a block diagram of a transmitting device 10 and a receiving device 20 configured to implement exemplary embodiments of the present invention. Referring to FIG. 12, the transmitting device 10 and the receiving device 20 respectively include radio frequency (RF) units 13 and 23 for transmitting and receiving radio signals carrying information, data, signals, and/or messages, memories 12 and 22 for storing information related to communication in a wireless communication system, and processors 11 and 21 connected operationally to the RF units 13 and 23 and the memories 12 and 22 and configured to control the memories 12 and 22 and/or the RF units 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers. The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the RF unit 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include Nt (where Nt is a positive integer) transmit antennas.

A signal processing process of the receiving device 20 is the reverse of the signal processing process of the transmitting device 10. Under the control of the processor 21, the RF unit 23 of the receiving device 10 receives RF signals transmitted by the transmitting device 10. The RF unit 23 may include Nr receive antennas and frequency down-converts each signal received through receive antennas into a baseband signal. The RF unit 23 may include an oscillator for frequency down-conversion. The processor 21 decodes and demodulates the radio signals received through the receive antennas and restores data that the transmitting device 10 wishes to transmit.

The RF units 13 and 23 include one or more antennas. An antenna performs a function of transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An RF unit supporting a MIMO function of transmitting and receiving data using a plurality of antennas may be connected to two or more antennas.

In embodiments of the present invention, a UE serves as the transmission device 10 on uplink and as the receiving device 20 on downlink. In embodiments of the present invention, an eNB serves as the receiving device 20 on uplink and as the transmission device 10 on downlink.

The transmitting device and/or the receiving device may be configured as a combination of one or more embodiments of the present invention.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

INDUSTRIAL APPLICABILITY

The present invention may be used for a wireless communication apparatus such as a user equipment (UE), a relay and an eNB.

What is claimed is:

1. A method for receiving a downlink signal in a wireless communication system, the method comprising:
    transmitting, by a user equipment (UE), information about vertical angle restriction to be used for a precoding matrix which the UE desires to an eNodeB (eNB); and
    receiving, by the UE, a downlink signal precoded according to the information about vertical angle restriction,
    wherein the information about vertical angle restriction includes values indicating a lower limit angle and an upper limit angle for the precoding matrix,
    wherein the information about vertical angle restriction is transmitted through periodic reporting scheme, the information about vertical angle restriction being transmitted at a transmission timing independent of transmission timings of other values for channel state reporting, and
    wherein the information about vertical angle restriction is dropped when the transmission timing of the information about vertical angle restriction and a transmission timing of an RI frank indicator) or a CQI (channel quality indicator) overlap, and a PMI (precoding matrix index) is dropped when the transmission timing of the information about vertical angle restriction and a transmission timing of the PMI overlap.

2. The method according to claim 1, further comprising receiving, from the eNB, control information about the vertical angle restriction,
    wherein the control information includes a hold command for holding an vertical angle of the precoding matrix at a specific angle between the lower limit angle and the upper limit angle and a period for holding the vertical angle.

3. The method according to claim 1, further comprising receiving, by the UE, control information about the vertical angle restriction from the eNB,
    wherein the control information includes a hold command for holding an vertical angle of the precoding matrix at a specific angle between the lower limit angle and the upper limit angle, and the hold command is valid until a holding release command is received.

4. The method according to claim 1, further comprising receiving, from the eNB, control information about the vertical angle restriction,
    wherein the control information includes a command for excluding a specific angle range between the lower limit angle and the upper limit angle.

5. The method according to claim 4, wherein the control information includes a command for excluding a plurality of specific angle ranges, the method further comprising generating, by the UE, a codebook in an angle range excluding the plurality of specific angle ranges.

6. A method for transmitting a downlink signal in a wireless communication system, the method comprising:
    receiving, by an eNodeB (eNB), information about vertical angle restriction to be used for a precoding matrix which a user equipment (UE) desires from the UE; and
    transmitting, by the eNB, a downlink signal precoded according to the information about vertical angle restriction,
    wherein the information about vertical angle restriction includes values indicating a lower limit angle and an upper limit angle for the precoding matrix,
    wherein the information about vertical angle restriction is transmitted through periodic reporting scheme, the information about vertical angle restriction being transmitted at a transmission timing independent of transmission timings of other values for channel state reporting, and
    wherein the information about vertical angle restriction is dropped when the transmission timing of the information about vertical angle restriction and a transmission timing of an RI (rank indicator) or a CQI (channel quality indicator) overlap, and a PMI (precoding matrix index) is dropped when the transmission timing of the information about vertical angle restriction and a transmission timing of the PMI overlap.

7. The method according to claim 6, further comprising transmitting, by the eNB, control information about the vertical angle restriction to the UE,
    wherein the control information includes a hold command for holding an vertical angle of the precoding matrix at a specific angle between the lower limit angle and the upper limit angle and a period for holding the vertical angle.

8. The method according to claim 6, further comprising transmitting, by the eNB, control information about the vertical angle restriction to the UE,
    wherein the control information includes a hold command for holding an angle of the vertical beam direction at a specific angle between the lower limit angle and the upper limit angle, and the hold command is vaild until the UE receives a holding release command.

9. The method according to claim 6, further comprising transmitting, by the eNB, control information about the vertical angle restriction to the UE,
    wherein the control information includes a command for excluding a specific angle range between the lower limit angle and the upper limit angle.

10. The method according to claim 9, wherein the control information includes a command for excluding a plurality of specific angle ranges, the method further comprising generating, by the eNB, a codebook in an angle range excluding the plurality of specific angle ranges.

11. A user equipment (UE) configured to receive a downlink signal in a wireless communication system, comprising:
a radio frequency (RF) unit; and
a processor configured to control the RF unit,
wherein the processor is configured to transmit information about vertical angle restriction to be used for a precoding matrix which the UE desires to an eNodeB (eNB) and to receive a downlink signal precoded according to the information about vertical angle restriction,
wherein the information about vertical angle restriction includes values indicating a lower limit angle and an upper limit angle for the precoding matrix,
wherein the information about vertical angle restriction is transmitted through periodic reporting scheme, the information about vertical angle restriction being transmitted at a transmission timing independent of transmission timings of other values for channel state reporting, and
wherein the information about vertical angle restriction is dropped when the transmission timing of the information about vertical angle restriction and a transmission timing of an RI frank indicator) or a CQI (channel quality indicator) overlap, and a PMI (precoding matrix index) is dropped when the transmission timing of the information about vertical angle restriction and a transmission timing of the PMI overlap.

* * * * *